(12) United States Patent
Trojer et al.

(10) Patent No.: US 10,484,045 B2
(45) Date of Patent: Nov. 19, 2019

(54) TESTING A CABLE

(71) Applicant: TELEFONAKTIEBOLAGET LM ERICSSON (PUBL), Stockholm (SE)

(72) Inventors: Elmar Trojer, Täby (SE); Sándor Albrecht, Sundbyberg (SE); Miguel Berg, Upplands Väsby (SE); Per-Erik Eriksson, Stockholm (SE); Chenguang Lu, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/523,760

(22) PCT Filed: Nov. 25, 2014

(86) PCT No.: PCT/SE2014/051403
§ 371 (c)(1),
(2) Date: May 2, 2017

(87) PCT Pub. No.: WO2016/085371
PCT Pub. Date: Jun. 2, 2016

(65) Prior Publication Data
US 2017/0317717 A1    Nov. 2, 2017

(51) Int. Cl.
*H04W 24/08* (2009.01)
*H04W 88/08* (2009.01)
(Continued)

(52) U.S. Cl.
CPC .............. *H04B 3/46* (2013.01); *H04B 17/40* (2015.01); *H04W 24/08* (2013.01); *H04W 88/085* (2013.01)

(58) Field of Classification Search
CPC ......... H04B 3/46; H04B 17/40; H04W 24/08; H04W 88/085; G01R 31/02
See application file for complete search history.

(56) References Cited

U.S. PATENT DOCUMENTS

2012/0099436 A1* 4/2012 Afzal .................. H04B 10/071
370/241
2012/0306895 A1* 12/2012 Faulkner ................. H04L 43/50
345/501

(Continued)

OTHER PUBLICATIONS

Ericsson AB et al., "Common Public Radio Interface (CPRI); Interface Specification," CPRI Specification V6.0, Aug. 30, 2013.
(Continued)

*Primary Examiner* — Dong-Chang Shiue
(74) *Attorney, Agent, or Firm* — Patent Portfolio Builders PLLC (57) ABSTRACT

It is presented a method for testing a cable connectable to a remote radio head. The method is performed in a test device and comprises the steps of: generating an outbound test container, the outbound test container comprising digital samples representing a test signal; transmitting the outbound test container and a frequency parameter indicating a frequency on which the test signal is to be transmitted to a converter device being connectable to a plurality of remote radio heads via respective cables, for transmission by the converter device; receiving an inbound test container, the inbound test container comprising digital samples of a response signal received by the converter device based on the outbound test container; and evaluating the inbound test container.

23 Claims, 5 Drawing Sheets

(51) Int. Cl.
*H04B 3/46* (2015.01)
*H04B 17/40* (2015.01)

(56) References Cited

U.S. PATENT DOCUMENTS

2013/0163524 A1* 6/2013 Shatzkamer ............ H04L 69/22
370/329
2013/0182753 A1* 7/2013 Delforce ............ H04B 17/0085
375/228

OTHER PUBLICATIONS

Etsi, "Digital cellular telecommunications system (Phase 2+); Universal Mobile Telecommunications System (UMTS); LTE; E-UTRA, UTRA and GSM/EDGE; Multi-Standard Radio (MSR) Base Station (BS) radio transmission and reception (3GPP TS 37.104 version 11.9.0 Release 11)," ETSI TS 137 104 V11.9.0, Jul. 2014.
International Search Report and Written Opinion dated Jul. 21, 2015 in related International Application No. PCT/SE2014/051403.
International Telecommunication Union, "Series G: Transmission Systems and Media, Digital Systems and Networks; Digital sections and digital line system—Access networks; Single-ended line testing for digital subscriber lines (DSL)," ITU-T, G.966.2, May 2009.
Portolan, "Packet-based JTAG for Remote testing," 2012 IEEE International Test Conference (ITC), Nov. 5-8, 2012, Anaheim, CA.

* cited by examiner

TESTING A CABLE

TECHNICAL FIELD

The invention relates to cable testing and in particular to testing a cable connectable to a remote radio head.

BACKGROUND

When deploying wireless communication networks, there is a balance between coverage and capacity. On the one hand, a few large cells can provide great coverage but at a cost of reduced capacity. On the other hand, a scenario with many small cells creates better capacity and throughput, but may not provide the desired coverage. Hence, there is often a combination of larger cells to provide sufficient coverage with smaller cells to provide better capacity.

However, when the cells get too small, wireless terminals moving in the network cause a great number of handovers which causes significant overhead. Moreover, providing coverage indoors using many small cells can be quite costly, with a radio base station for each such small cell.

One solution to this problem is to use remote radio heads, where several remote radio heads connected to the same radio base station share the same cell. In this way, a single radio base station can provide coverage in different parts of the building by placing the remote radio heads appropriately. Moreover, the wireless device can move between the coverage of different remote radio heads while staying within the same cell, thus avoiding causing handovers. The wireless device will not realize that it is served by different remote radio heads, but see it as one single cell.

In small cell installations such as for remote radio heads, the cabling between to the remote radio heads has a direct and strong impact on overall system performance and service reliability.

SUMMARY

It is an object to provide a way to test cables connectable to remote radio heads.

According to a first aspect, it is presented a method for testing a cable connectable to a remote radio head. The method is performed in a test device and comprises the steps of: generating an outbound test container, the outbound test container comprising digital samples representing a test signal transmitting the outbound test container and a frequency parameter indicating a frequency on which the test signal is to be transmitted to a converter device being connectable to a plurality of remote radio heads via respective cables, for transmission by the converter device; receiving an inbound test container, the inbound test container comprising digital samples of a response signal received by the converter device based on the outbound test container; and evaluating the inbound test container.

The step of generating an outbound test container may comprise including the frequency parameter in the outbound test container. In such a case, the step of transmitting comprises transmitting the frequency parameter as part of the outbound test container.

The method may further comprise the step of: transmitting a test setup message to the converter device to configure the converter device to be in a test state.

The method may further comprise the step of: transmitting a test reset message to the converter device to configure the converter device to be in a fully operational state.

The step of generating the outbound test container may comprise generating the outbound test container comprising routing data, the routing data comprising any one or more of: multiple input multiple output, MIMO, branch, outbound port, and inbound port.

The step of evaluating the inbound test container may comprise estimating any one or more of cable length, near and remote termination type, time domain transfer function, frequency domain transfer function, amplitude transfer function, phase transfer function, return loss, insertion loss, cable delay and skew of a cable connected to the converter device.

The step of evaluating may comprise evaluating a noise level.

According to a second aspect, it is presented a test device for testing a cable connectable to a remote radio head. The test device comprises: a processor; and a memory storing instructions that, when executed by the processor, causes the test device to: generate an outbound test container, the outbound test container comprising digital samples representing a test signal; transmit the outbound test container and a frequency parameter indicating a frequency on which the test signal is to be transmitted to a converter device being connectable to a plurality of remote radio heads via respective cables, for transmission by the converter device; receive an inbound test container, the inbound test container comprising digital samples of a response signal received by the converter device based on the outbound test container; and evaluate the inbound test container.

The instructions to generate an outbound test container may comprise instructions that, when executed by the processor, causes the test device to include the frequency parameter in the outbound test container. In such a case, the instructions to transmit an outbound test container comprises instructions that, when executed by the processor, causes the test device to transmit the frequency parameter as part of the outbound test container.

The test device may further comprise instructions that, when executed by the processor, causes the test device to transmit a test setup message to the converter device to configure the converter device to be in a test state.

The test device may further comprise instructions that, when executed by the processor, causes the test device to transmit a test reset message to the converter device to configure the converter device to be in a fully operational state.

The instructions to generate the outbound test container may comprise instructions that, when executed by the processor, causes the test device to generate the outbound test container comprising routing data, the routing data comprising any one or more of: multiple input multiple output, MIMO, branches, outbound port, and inbound port.

The step instructions to evaluate the inbound test container comprise instructions that, when executed by the processor, causes the test device to estimate any one or more of cable length, near and remote termination type, time domain transfer function, frequency domain transfer function, amplitude transfer function, phase transfer function, return loss, insertion loss, cable delay and skew of a cable connected to the converter device.

The instructions to evaluate may comprise instructions that, when executed by the processor, causes the test device to evaluate a noise level.

According to a third aspect, it is presented a test device comprising: means for generating an outbound test container, the outbound test container comprising digital samples representing a test signal; means for transmitting the outbound test container and a frequency parameter indicating a frequency on which the test signal is to be transmitted to a converter device being connectable to a plurality of remote radio heads via respective cables, for transmission by the converter device; means for receiving an inbound test container, the inbound test container comprising digital samples of a response signal received by the converter device based on the outbound test container; and means for evaluating the inbound test container.

According to a fourth aspect, it is presented a computer program for a test device. The computer program comprises computer program code which, when run on a test device causes the test device to: generate an outbound test container, the outbound test container comprising digital samples representing a test signal; transmit the outbound test container and a frequency parameter indicating a frequency on which the test signal is to be transmitted to a converter device being connectable to a plurality of remote radio heads via respective cables, for transmission by the converter device; receive an inbound test container, the inbound test container comprising digital samples of a response signal received by the converter device based on the outbound test container; and evaluate the inbound test container.

According to a fifth aspect, it is presented a computer program product comprising a computer program according to the fourth aspect and a computer readable means on which the computer program is stored.

According to a sixth aspect, it is presented a method for enabling testing of a cable connected to a converter device, the cable being connectable to a remote radio head. The method is performed in the converter device and comprises the steps of: receiving an outbound test container and a frequency parameter from a test device, the outbound test container comprising digital samples representing a test signal, wherein the frequency parameter indicates a frequency on which the test signal is to be transmitted; converting the digital samples of the outbound test container to an analogue test signal on the frequency indicated by the frequency parameter; transmitting the analogue test signal on a cable connected to the converter device; receiving an analogue response signal from a cable connected to the converter device; generating an inbound test container comprising digital samples of the analogue response signal; and transmitting the inbound test container to the test device.

The method may further comprise the steps of: receiving a test setup message from the test device to configure the converter device to be in a test state; and configuring the converter device to be in a test state.

The step of configuring the converter device to be in a test state may comprise setting a first port of the converter device as a port to be used for transmitting the analogue test signal, and/or setting a second port of the converter device as a port to be used for receiving the analogue response signal.

The method may further comprise the steps of: receiving a test reset message from the test device to configure the converter device to be in an operational state; and configuring the converter device to be in an operational state.

According to a seventh aspect, it is presented a converter device for enabling testing of a cable connected to the converter device, the cable being connectable to a remote radio head. The converter device comprises: a processor; and a memory storing instructions that, when executed by the processor, causes the converter device to: receive an outbound test container and a frequency parameter from a test device, the outbound test container comprising digital samples representing a test signal, wherein the frequency parameter indicates a frequency on which the test signal is to be transmitted; convert the digital samples of the outbound test container to an analogue test signal on the frequency indicated by the frequency parameter; transmit the analogue test signal on a cable connected to the converter device; receive an analogue response signal from a cable connected to the converter device; generate an inbound test container comprising digital samples of the analogue response signal; and transmit the inbound test container to the test device.

The converter device may further comprise instructions that, when executed by the processor, causes the converter device to: receive a test setup message from the test device to configure the converter device to be in a test state; and to configure the converter device to be in a test state.

The instructions to configure the converter device to be in a test state may comprise instructions that, when executed by the processor, causes the converter device to set a first port of the converter device as a port to be used for transmitting the analogue test signal, and/or to set a second port of the converter device as a port to be used for receiving the analogue response signal.

The converter device may further comprise instructions that, when executed by the processor, causes the converter device to: receive a test reset message from the test device to configure the converter device to be in an operational state; and to configure the converter device to be in an operational state.

According to an eighth aspect, it is presented a converter device comprising: means for receiving an outbound test container and a frequency parameter from a test device, the outbound test container comprising digital samples representing a test signal, wherein the frequency parameter indicates a frequency on which the test signal is to be transmitted; means for converting the digital samples of the outbound test container to an analogue test signal on the frequency indicated by the frequency parameter; means for transmitting the analogue test signal on a cable connected to the converter device, the cable being a connectable to a remote radio head; means for receiving an analogue response signal from a cable connected to the converter device; means for generating an inbound test container comprising digital samples of the analogue response signal; and means for transmitting the inbound test container to the test device.

According to a ninth aspect, it is presented a computer program for enabling testing of a cable connected to the converter device, the cable being connectable to a remote radio head. The computer program comprises computer program code which, when run on the converter device causes the converter device to: receive an outbound test container and a frequency parameter from a test device the outbound test container comprising digital samples representing a test signal, wherein the frequency parameter indicates a frequency on which the test signal is to be transmitted; convert the digital samples of the outbound test container to an analogue test signal on the frequency indicated by the frequency parameter; transmit the analogue test signal on a cable connected to the converter device; receive an analogue response signal from a cable connected to the converter device; generate an inbound test container comprising digital samples of the analogue response signal; and transmit the inbound test container to the test device.

According to a tenth aspect, it is presented a computer program product comprising a computer program according to the ninth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
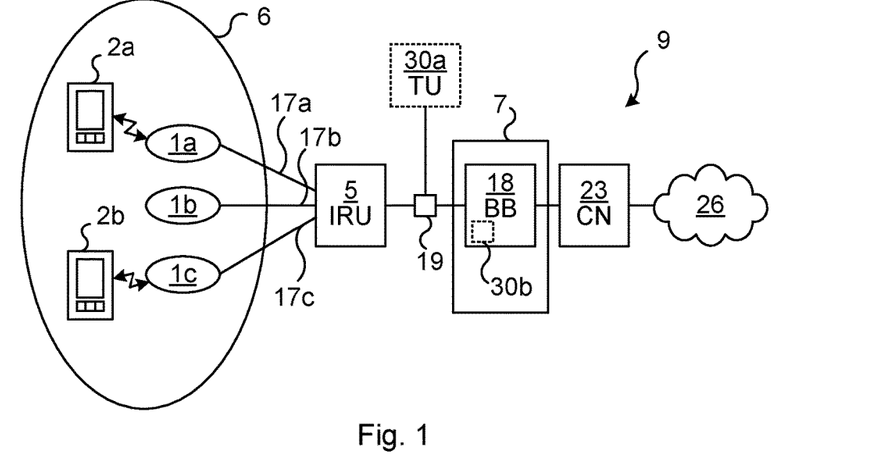
FIG. 1 is a schematic architecture diagram illustrating an environment where embodiments presented herein can be applied.

FIG. 1 is a schematic architecture diagram illustrating an environment where embodiments presented herein can be applied. A wireless communication network 9 comprises a number of remote radio heads 1a-c for installation in locations where traditional deployment with antennas being co-located with the radio base stations is not ideal. For example, the wireless communication network 9 can be installed indoors, such as in an office, shopping centre, train station or airport or outdoors such as in a theme park or sports arena (which may also include indoor areas).

It is to be noted that, while the embodiments presented herein are described as implemented using LTE (Long Term Evolution) and/or W-CDMA (Wideband Code Division Multiplex), any applicable communication standard may be used, such as any one or a combination of LTE-SAE (Long Term Evolution-System Architecture Evolution), GSM (Global System for Mobile communication), EDGE (Enhanced Data Rates for GSM Evolution), GPRS (General Packet Radio Service), CDMA2000 (Code Division Multiple Access 2000), any of the IEEE 802.11 standards, or any other current or future wireless network, such as LTE-Advanced, as long as the principles described hereinafter are applicable.

A baseband module 18 forms part of a radio base station 7 and is responsible for baseband processing in accordance with the standard(s) applied for the wireless communication network 9. The radio base station 7 can e.g. perform functions for an eNodeB (evolved Node B), Node B, BTS (Base Transceiver Station), etc. The baseband module 18 connects to the remote radio heads 1a-c via a converter device 5, also known as an indoor radio unit (IRU). It is to be noted though that the converter device 5 may also be provided outside whenever appropriate. The converter device 5 is in turn connected to, and is a link for, a number (in this example three) remote radio heads 1a-c via respective cables 17a-c. In this way, the baseband module 18 is a link for uplink and downlink communication for the remote radio heads connected to the converter device 5.

It is to be noted that the converter device 5 can be combined with the baseband module 18 in one apparatus or be separate as shown in FIG. 1. The link between the baseband module 18 and the converter device 5 is a digital link, e.g. over one or more optical fibres supporting CPRI (Common Public Radio Interface) which is a serial digital interface or any other current or future fronthaul communication interface.

The structure of CPRI will now be described in some more detail. To allow recovery of a UMTS (Universal Mobile Telecommunications System) chip clock of 3.84 MHz, CPRI line rates have been specified as multiples of 3.84 MHz which defines the length of a basic frame (1/3.84 MHz=260.4167 ns).

Each basic frame consist of 16 words, with the number of bits per word ranging from 8 bits (option 1, 8B/10 B coding, 614.4 Mbps), over 16 (option 2, 8B/10B, 1228.8 Mbps), 32 (option 3, 8B/10B, 2457.6 Mbps), 40 (option 4, 8B/10B, 3072 Mbps), 64 (option 5, 8B/10B, 4915.2 Mbps), 80 (option 6, 8B/10B, 6114 Mbps), 128 (option 7, 8B/10B, 9830.4 Mbps), to a maximum of 160 bits (option 8, 64B/66B, 10138.6 Mbps).

Portions of the basic frame are used for control, synchronization/timing, and the remainder for sampled I/Q antenna stream data.

The samples for I/Q data for a given antenna carrier (AxC) are multiplexed into an AxC container. Several AxCs with the same sample format and rate can be combined into an AxC group. A number of AxC groups are then mapped into an AxC container that fills the I/Q portion of a basic frame. Also, AxC containers can be grouped into AxC container groups.

In standard format, I/Q samples are stored together with a given sampling resolution (downlink 8-20 bits/sample, uplink 4-20 bits/sample). Also a mantissa and exponent format can be used.

When packaged, the AxC containers follow sequentially and unused bits are reserved. Alternatively, a flexible position can be employed, where AxC containers can be placed flexibly.

Moreover, the CPRI channel also defines a periodic measurement of link delay and round trip delay. Those measurements are used to check compliance with timing accuracies required by radio standard, e.g. TX (transmission) diversity, MIMO (Multiple Input Multiple Output) compliance, UE positioning with GPS timing alignment, timing alignment between transmitter branches, timing advance in E-UTRA, GSM internal BTS carrier timing and delay tracking. The measurement results are available at the master CPRI unit, which in the system of FIG. 1 is a test device 30a, 30b.

The delay accuracy in downlink is stated as ±8.138 ns (±Tc/32), and round trip delay accuracy as ±16.276 ns (±Tc/16). The same value is required for Tx-Rx switching accuracy in TDD (Time Division Duplex) systems. The delay accuracy excludes the delay introduced by the cable.

An Ethernet CAT cable introduces a delay of around 1 us and delay skew between pairs of approximately 100 ns over 200 meters.

Using SELT (Single Ended Line Test), the timing of a response of a known signal can be used to estimate cable length. With the given accuracy mentioned above, the maximum resolution of SELT over CPRI is given by ~3.255 meters (200 meters*16.276 ns/1 us) which is sufficient to reach a targeted accuracy of 5 meters. Delay skew of pairs in the cable are detected with a resolution of 32 meters.

Looking now to other parts of the communication network 9, the baseband module 18 is also connected to a core network 23. The core network 23 provides central functions and connectivity to external networks 26 such as the Internet and/or voice services.

The remote radio heads 1a-c connected to the converter device 5 are part of a single radio cell 6 and thus share a cell identifier. Antennas do not need to form part of this embodiment of the radio base station 7 or the converter device 5, as the remote radio heads 1a-c provide the antennas for the wireless link to one or more wireless devices 2a-b. The wireless link provided by the remote radio heads 1a-c includes both downlink (DL) communication to the wireless devices 2a-b and/or uplink (UL) communication from the wireless devices 2a-b. The term wireless device is also known as mobile communication terminal, user equipment (UE), station (STA), mobile terminal, user terminal, user agent, machine-to-machine devices etc., and can be, for example, what today is commonly known as a mobile phone or a tablet/laptop with wireless connectivity or fixed mounted terminal.

In radio communication systems, the data is transmitted and received over the air at a specific radio frequency—either the same for transmission and reception or on separate frequencies. This is often called the radio frequency (RF) or the carrier frequency.

There are many different carrier frequencies, depending on regional spectrum allocation and spectrum license rights. To create a common radio implementation supporting this variety of carrier frequencies, a second set of frequencies is used herein, denoted the Intermediate Frequency (IF), which is used for communication on the cables 17a-c between the converter device 5 and the remote radio heads 1a-c.

It is to be noted that the processing of uplink and downlink signals in the converter device 5 and the remote radio heads 1a-c can, but do not have to, occur in the digital domain. Alternatively or additionally, this processing is performed in the analogue domain.

The remote radio heads 1a-c convert from IF to RF for downlink transmission and from RF to IF for uplink reception. Conversely, the converter device 5 converts from digital BB (baseband) to IF for downlink transmission and from IF to digital BB for uplink reception.

By using analogue or digital IF instead of RF over the cables 17a-c between the converter device 5 and the remote radio heads 1a-c, cheaper, widely deployed electrical cables can be used, such as Ethernet LAN cabling. In this way, existing indoor cabling can many times be reused during installation, which significantly saves cost, installation time and complexity. Optionally, the remote radio heads 1a-c are also powered over the respective cables.

The transmission and reception is under the control of the RLC (Radio Link Controller and MAC (Media Access Control) scheduler in the baseband module 18. The RLC/MAC scheduler informs what transmissions should be made and informs, via the downlink signaling, the wireless devices when to transmit and on which frequency and power.

It is to be noted that, although FIG. 1 shows the baseband module 18 connected to one converter device 5, each baseband module 18 can be connected to several converter devices. Each converter device may have its own cell or several converter devices may share a single cell.

It is to be noted that while the embodiment of FIG. 1 shows three remote radio heads 1a-c, there may be fewer or more remote radio heads connected to each converter device 5.

Typically, the length of the cables 17a-c is limited but can e.g. reach 150-200 meters are with good quality cables.

The quality of the cable material, connectors, and patch panels used in the cable installation, as well as strict compliance to building practice guidelines are crucial for the system to operate with acceptable performance.

A number of conditions in the link from the converter device 5 to the remote radio heads 1a-c which affect performance are listed here:

Transmission characteristics of the cable (category, insertion loss, NEXT (Near End Crosstalk), FEXT (Far End Crosstalk), alien xtalk (crosstalk), delay and delay skew Connectors and connector-to-cable mounting (return loss, xtalk, shielding, EMI (Electro-Magnetic Interference))

Patch panels (isolation, return loss)

Building practice, such compliance with minimum and maximum cable length, number of patch panels, min cable bend-radius, noise environment (especially alien x-talk, radio frequency ingress)

PoE compliance (DC resistance, cable length, twisted pair usage)

In one cable installation procedure, the location of active equipment such as the converter device 5 and remote radio heads 1a-c are determined iteratively based on design targets such as radio coverage/capacity (signal to interference and noise ratio, peak-rate) as well as building infrastructure. This can e.g. be in simulation tools. In a second step, cable routes are determined, cables are pulled and connected and patch panels are placed. Then, the active equipment is installed, powered, and services are commissioned. During operation, KPIs (Key Performance Indicators) on system performance, warnings/alarms are used to detect and correct faults.

Hence, cable installations are complex and increase in complexity when the number of remote radio heads increase. Moreover, when Ethernet LAN cabling is used for remote radio head connections, it is even more important to verify that the cabling is of sufficient quality for such a deployment. By checking the performance of the cables 17a-c between the remote radio heads 1a-c and the converter device 5 issues with a particular cable 17a-c can be found and addressed.

According to embodiments presented herein, one or more of the cables 17a-c can be tested using a test device 30a, 30b. In one embodiment, the test device 30a is a separate device 30a connected via an auxiliary multiplexing unit 19. Alternatively or additionally, the test device Sob forms part of the baseband module 18 as additional software or hardware.

According to embodiments presented herein, a test container is introduced which can be mapped the same way as AxC containers over the CPRI interface between the baseband device 18 and the converter device 5. The test container is used to transport a variety of cable test signals and handled by existing equipment the same way as regular AxC containers. The test container can be configured to have a shorter life cycle than regular AxC containers, to only be active during a test period.

Hence, the test device 30a, 30b generates an outbound test container which the converter device 5 transmits over one or more of the cable(s) 17a-c. By evaluating the response in an inbound test container, the test device 30a, 30b is thus able to evaluate the performance of one or more of the cables 17a-c. This testing can then be configured to test particular characteristics which are important for the deployment of remote radio heads.

The content of the outbound test container depends on what is to be tested, which is explained in more detail below.

Figure 2:
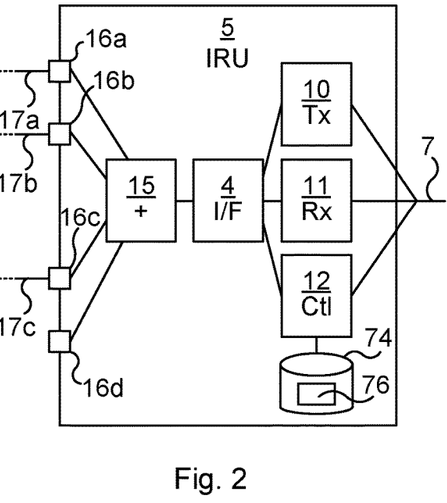
FIG. 2 is a schematic diagram illustrating components of an embodiment of a converter device of FIG. 1.

FIG. 2 is a schematic diagram illustrating components of an embodiment of a converter device 5 of FIG. 1. The converter device 5 and its components will now be explained in a context of uplink and downlink communication using a remote radio head.

The converter device 5 comprises one or more ports 16a-d to which cables 17a-c can be connected. These cables are used to connect remote radio heads to the converter device 5 as explained above. There can be zero, one or several remote radio heads connected to each port 16a-d of the converter device 5 as desired to achieve a suitable topology of remote radio heads.

For uplink communication, the remote radio heads downconvert a received (uplink) signal to IF and send it over its cable 17a-c to the converter device 5. The received IF signals from several remote radio heads are combined in a combiner 15 and fed to an interface circuitry 4. The interface circuitry 4 extracts the received IF signal from the interface and forwards it to the RX (reception) back-end 11. In one embodiment, the RX back-end 11 comprises an analogue to digital (A/D) converter which samples the signal on IF and converts to a digital signal. In another embodiment, the RX back-end 11 first downconverts the received signals from IF to an analogue BB signal which is further filtered and converter to a digital signal in an analogue to digital converter. The RX back-end 11 sends the combined received signals in digital form to the baseband module for further processing such as demodulation, decoding, etc. as known in the art per se.

For downlink communication, the process works in reverse to the uplink. Hence, the baseband module sends a digital BB signal for transmission to a TX (transmission) back-end 10 of the converter device 5. In one embodiment, the TX back-end 10 converts the digital BB signal to an analogue signal in IF directly in a digital to analogue (D/A) converter. In another embodiment, the TX back-end 10 pulse first converts the digital BB signal to an analogue transmission signal and upconverts the transmission signal to IF in the analogue domain. The transmission signal in IF is then inserted onto the interface by the interface circuitry 4, and provided to the combiner 15 which also functions as a splitter, providing the same transmission signal in IF to all connected remote radio heads over the respective cables. The remote radio heads then upconvert the IF signal to RF and transmit the RF signal over the air to the wireless devices 2a-b.

It is to be noted that there could be several parallel combiners, each being connected to a subset of the ports 16a-d. It is to be noted that if there are digital transmissions between the converter device 5 and the remote radio heads, there is no A/D conversion or D/A conversion in the converter device 5. Instead, the converter device 5 would then perform digital processing such as digital adding, framing, etc.

Moreover, there is a control link between a processor 12 in the converter device 5 and each remote radio head. This control link can be used e.g. to configure the remote radio head to enter an impedance mismatch state to allow reflections of test signals over the cables 17a-c.

Figure 3:
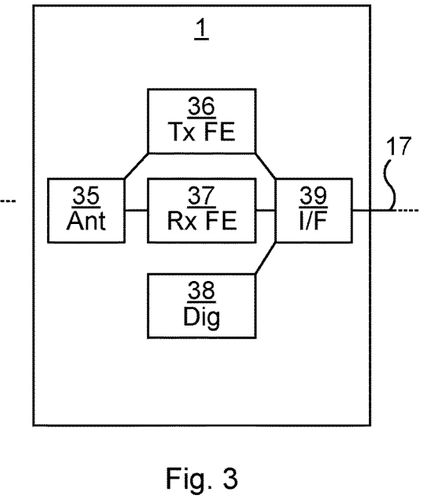
FIG. 3 is a schematic architecture diagram illustrating components of an embodiment of a remote radio head of FIG. 1.

FIG. 3 is a schematic architecture diagram illustrating components of an embodiment of a remote radio head of FIG. 1, here represented by a single remote radio head 1. The remote radio head comprises an interface circuitry 39, a transmission front-end 36, a reception front-end 37, a digital unit 38 and an antenna device 35. It is to be noted that the antenna device 35 may comprise any number of antenna, e.g. one, two, four, six, eight, etc. When two or more antennas are used, MIMO (Multiple Input Multiple Output) can be employed. It should also be noted that a remote radio head may also support TDD (Time Division Duplex)/FDD (Frequency Division Duplex) operation and multi-band operation.

In line with what is explained above, the RX Front End 37 downconverts received signals in RF to digital or analogue IF for transfer over the cable to the converter device 5. Moreover, the TX Front End 36 upconverts transmission signals from IF, as received over the cable from the converter device 5 to RF for transmission to wireless devices.

The antenna device 35 may comprise one or more antenna elements for each antenna. Particularly, the antenna can comprise one or more antenna elements in a first polarisation and one or more antenna elements in a second polarisation to achieve an additional dimension of orthogonality. The two polarisations may be controlled separately. The antenna device 35 may also comprise appropriate filters to filter out unwanted signals.

The interface circuitry extracts (demultiplexes) the downlink transmission IF signal and the downlink control signal from the cable 17. Moreover, the interface circuitry 39 inserts (multiplexes) the uplink received IF signal and optionally the uplink control signal onto the cable 17. The interface circuitry 39 may use different frequency bands for uplink signals, downlink signals and control signals to thereby multiplex all of these on a single cable.

A digital unit 38 communicates with the processor 12 of the converter device. The digital unit 38 can be implemented using software instructions such as a computer program executed by a processor and/or using hardware, such as application specific integrated circuits, field programmable gate arrays, discrete logical components, etc. The digital unit 38 can e.g. set the remote radio head in an impedance mismatch state when instructed to do so by the converter device.

Figure 4:
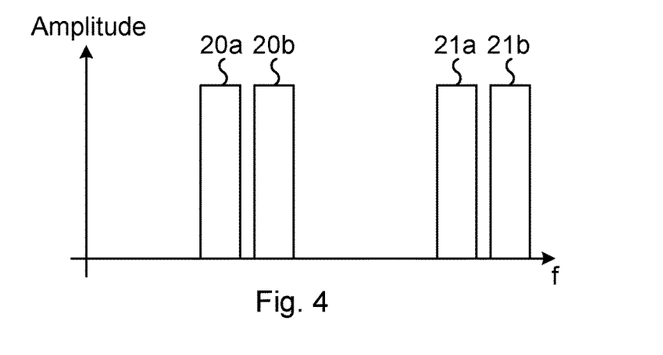
FIG. 4 is a schematic graph illustrating frequency components in the system of FIG. 1, as seen on a cable between the converter device and one of the remote radio heads.

FIG. 4 is a schematic graph illustrating frequency components in the system of FIG. 1, as seen on a cable between the converter device 5 and one of the remote radio heads. The horizontal axis represents frequency. The vertical axis represents amplitude, or power.

There are here two received signals 20*a-b* in separate frequency bands. The two received signals 20*a-b* can e.g. correspond to separate MIMO branches. Moreover, there are two transmission signals 21*a-b* in two separate frequency bands. The two transmission signals 21*a-b* can e.g. correspond to separate MIMO branches.

It is to be noted that LAN cables have several twisted pairs, allowing parallel transmission of e.g. MIMO branch signals. Moreover, when TDD is employed, a single frequency band can be used for uplink and downlink by allocating different time periods for uplink and downlink transmissions, respectively.

Figure 5:
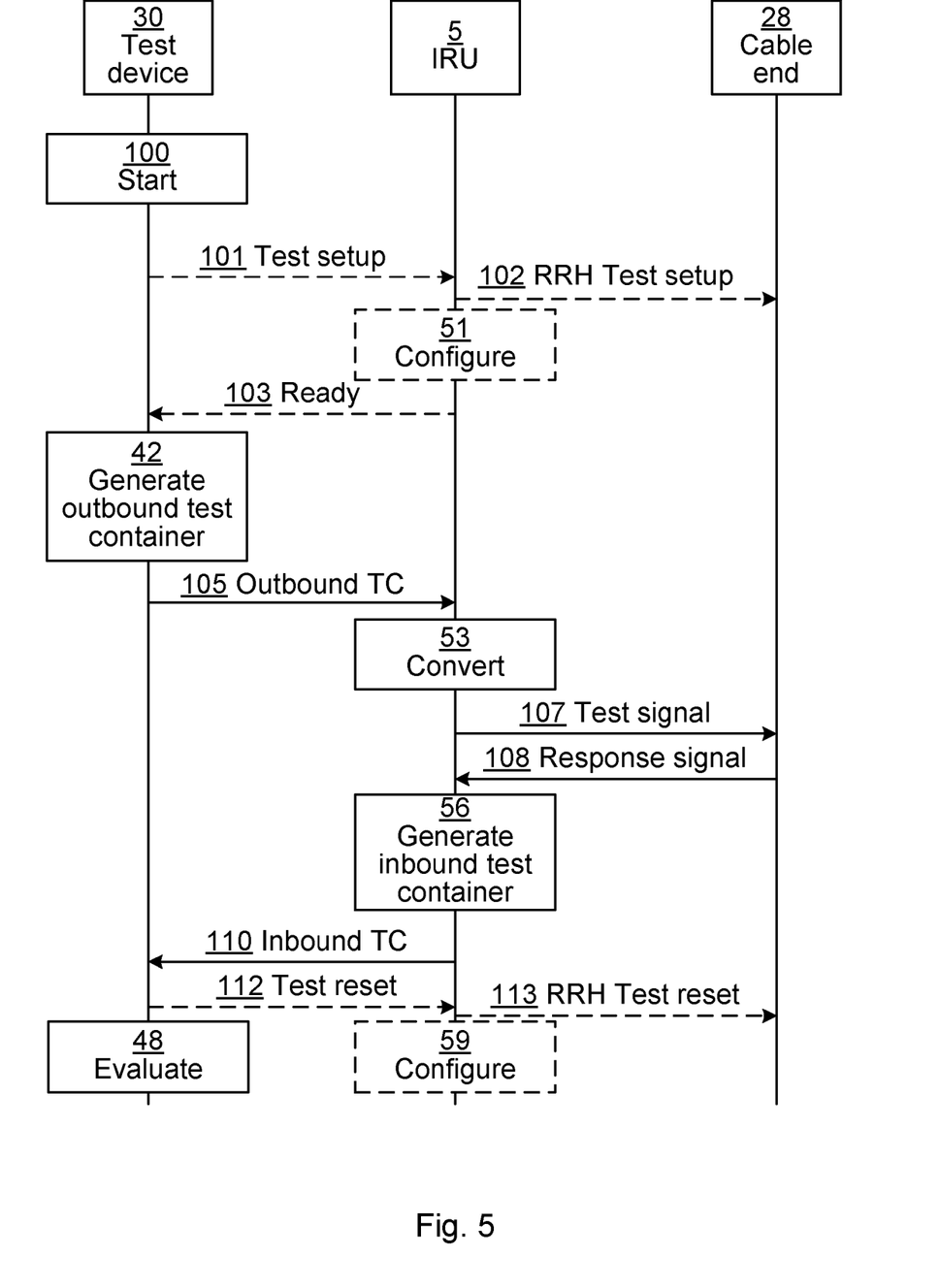
FIG. 5 is a sequence diagram illustrating communication between the test device and the converter device of FIG. 1.

FIG. 5 is a sequence diagram illustrating communication between the test device and the converter device of FIG. 1. The embodiments of the test devices 30*a*, of FIG. 1 are here represented by a single test device 30, since the communication works in the same way. In FIG. 5, a cable end 28 represents the end of a cable (17*a-c*) connected to the converter device. The cable end 28 can be open ended, i.e. no device connected to the cable end 28, or there may be a remote radio head connected to the cable end 28.

The sequence starts 100 in the test device 30. The sequence can e.g. be started at power up of the test device, at regular intervals or by a command from an operator.

Optionally, the test device sends a test setup message 101 to the converter device 5, to prepare for the testing to be done.

Optionally, the converter device 5 sends a RRH test setup message 102 to the cable end, which only makes sense when a remote radio head is connected to the cable end 28. The remote radio head then configures itself to be in an impedance mismatch state. This can e.g. imply that the remote radio head is set in a standby state or introduces an impedance mismatch in another way, to thereby allow reflections at the cable end 28.

As a response to receiving the test setup message, the converter device 5 configures itself to be in a test state. This can include transmitting test data on one or more specific ports and/or receiving response data on one or more specific ports. Once this test configuration 51 is done, the converter device responds with a ready message 103. Both the test setup message 101 and the ready message can e.g. be transmitted as operation and maintenance (OAM) messages which can be transported in the user defined portion of the basic frame of CPRI.

The test device then generates 42 an outbound test container comprising digital samples of a test signal. Included in the test container is a frequency on which the test signal is to be transmitted. As explained in more detail below, the test signal depends on the test or tests that are to be performed.

Once generated, the outbound test container 105 is transmitted over CPRI to the converter device 5. The converter device 5 then converts 53 the digital samples of the test signal to an analogue test signal, mixes the signals to a carrier frequency which corresponds to the frequency included in the test container and transmits the analogue test signal 107 on one or more ports (16*a-d* of FIG. 2) to a cable end 28, where a remote radio head can be installed, or is installed and is set in an impedance mismatch state.

An analogue response signal 108 is then received in the converter device 5, which is a response to the analogue test signal 107.

The analogue response signal 108 is then sampled to get a digital equivalent, which allows an inbound test container to be generated 56. The inbound test container 56 then comprises digital samples of the analogue response signal 108.

Once generated, the inbound test container 110 is transmitted to the test device 30 over the CPRI interface.

Optionally, after the test is done, the test device 30 sends a test reset message 112 to the converter device 5 to set it in a fully operational state again. As a response, when the RRH test setup message 102 was previously transmitted, the converter device 112 optionally sends a RRH test reset message 113 to the cable end 28 to set the remote radio head in an operational state again. The remote radio head acts upon this to set again set its impedance connected to the cable end 28 to a matching impedance.

It should be noted here that the test procedure that is shown in FIG. 5 can be used both for test calibration and for the actual cable test. During calibration, the converter device performs the test procedure with a well-known load at the test ports, like open/short/50 Ohm load at the cable port.

Figure 6A:
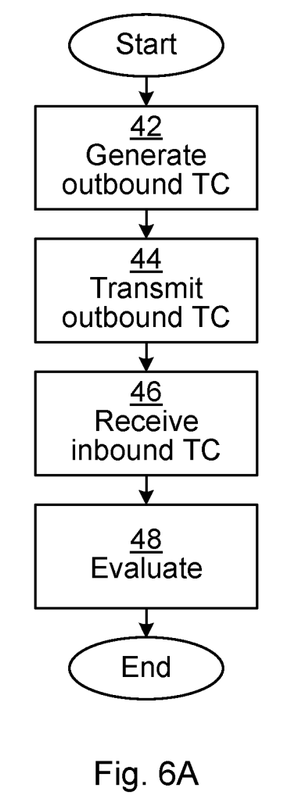
FIGS. 6A-B are flow charts illustrating embodiments of methods for testing a cable connectable to a remote radio head, performed in a test device.
Figure 6B:
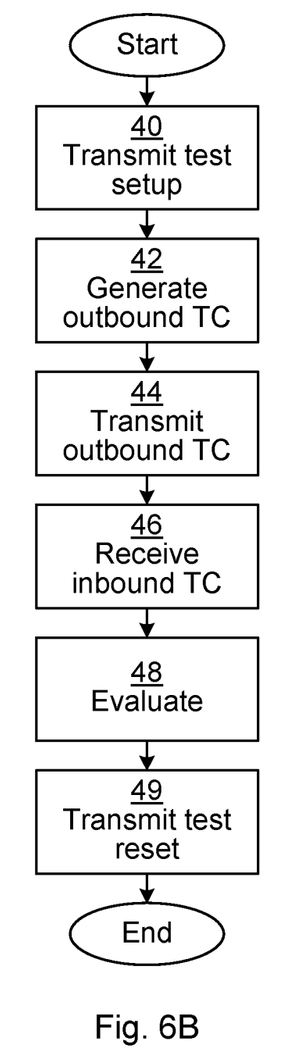

FIGS. 6A-B are flow charts illustrating embodiments of methods for testing a cable connectable to a remote radio head, performed in a test device (30*a-b* of FIG. 1). The method corresponds to the activities of the test device shown in FIG. 5 and described above.

In a generate outbound TC step 42, an outbound test container (105 of FIG. 5) is generated. The outbound test container comprises digital samples representing a test signal and more control data. Optionally, the outbound test container comprises a frequency parameter indicating a frequency on which the test signal is to be transmitted. The outbound test container can comprise routing data, the routing data comprising any one or more of: multiple input multiple output, MIMO, branch, outbound port(s), and inbound port(s) which is to be used by the converter device.

In a transmit outbound TC step 44, the outbound test container and a frequency parameter indicating a frequency on which the test signal is to be transmitted is transmitted to a converter device. As explained above, the converter device is connectable to a plurality of remote radio heads via respective cables. The outbound test container is intended for transmission by the converter device. This transmission occurs over CPRI. The frequency parameter can be part of the outbound test container or the frequency parameter can be transmitted separately from the outbound test container.

In a receive inbound TC step 46, an inbound test container (110 of FIG. 5) is received. The inbound test container comprises digital samples of a response signal received by the converter device based on the outbound test container. This is received over CPRI.

In an evaluate step 48, the inbound test container is evaluated. The evaluation depends on the content of the outbound test container generated in the generate outbound TC step 42. For instance a Time Domain Reflectometer (TDR) graph can be generated using the analogue test signal and the analogue response signal.

For instance, a Single Ended Line Test (SELT) can be employed to gain knowledge of a cable connected to the converter device.

When the test device knows the timing of the measurement, the delay of the CPRI interface (downlink delay, uplink delay) is used to subtract the delay from the measurement. As CPRI offers this information, it is easily deduced from the timing results. Details of this procedure are shown below.

Cable length can then be estimated by comparing the time of a peak (or other distinguishable part) in the test signal and the time of a corresponding peak (or other distinguishable part) in the response signal. The difference between these times can then be used to estimate the cable length. To illustrate accuracy, an outbound test container can be generated with 10 MHz bandwidth, 16 bit I/Q samples and 20 MSPS (Million Samples Per Second), which would result in an accuracy of cable length of about five meters.

Near and far termination type can be determined by frequency analysis of the time domain echo response. The echo response is translated to the transfer function giving indication of the cable and near or far end termination by examining the phase.

By comparing the outbound test container and the inbound test container, a time domain transfer function can be determined. Analogously, a frequency domain transfer function, an amplitude transfer function, and/or a phase transfer function can be determined.

Return loss and/or insertion loss and physical occurrences on the cable can be determined by relative power levels (peaks) in the calibrated echo response. This makes it possible to find erroneous cable connections, cable breaks, and many other irregularities in the cable installation.

Cable delay can be determined by finding a relative time difference between peaks in the time domain echo graph and frequency offsets in frequency domain analysis.

Skew can be determined by finding a difference in arrival time of simultaneously transmitted bits.

Moreover, a noise level can be determined by evaluating a noise level of the inbound test container signals. In this case, the noise level can be determined without the need of a particular outbound test container.

Looking now to FIG. 6B, only new or modified steps compared to the method illustrated by the flow chart of FIG. 6A will be described.

In a transmit test setup step 40, a test setup message is transmitted to the converter device. In this way, the converter device is configured to be in a test state. The test setup includes an indication of a configuration to be applied at the converter device during the test procedure. This configuration can comprise setting one or more first ports of the converter device as one or more outbound ports to be used for transmitting the analogue test signal and/or setting one or more inbound port of the converter device as a port to be used for receiving the analogue response signal. The outbound ports and the inbound ports may, but do not need to, overlap. This configuration can replace or complement the routing data mentioned above for the generate outbound TC step 42.

In a transmit test reset step 49, a test reset message is transmitted to the converter device. In this way, the converter device is configured to be in a fully operational state, whereby the converter device can return to its state prior to the method starting.

A cross-talk test container can be generated which covers several streams of test signals and would be mapped into an AxC group. Such a group can be used to generate a test stimulus on one port (or one pair in a cable), and receive noise measurement and one or several other ports (or pairs in same port or different port).

As an example, NEXT (Near End Crosstalk) within the cable can be measured by transmitting on one pair and measuring on the remaining three pairs of the same cable, in an example where there are four pairs in a cable (which can be the case when Ethernet CAT cabling is used). In order to measure alien crosstalk (crosstalk between cables), crosstalk container groups comprising test containers for all four pairs of a first cable is generated, and noise received on pairs of another cable is evaluated. In this embodiment, the setup test message then comprises a selection of ports to be utilised in the converter device as described above.

Figure 7A:
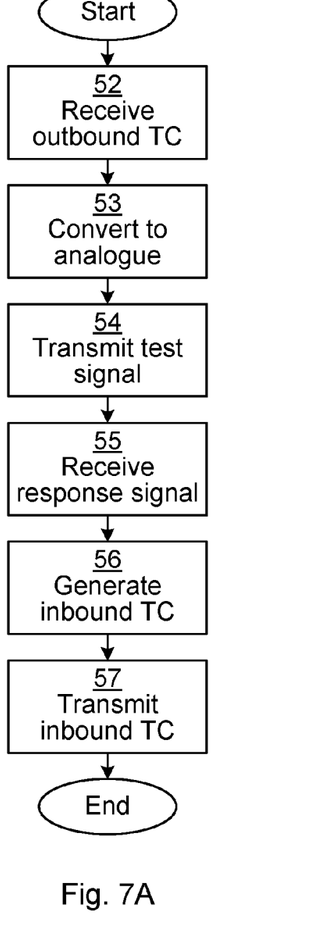
FIGS. 7A-B are flow charts illustrating embodiments of methods for testing a cable connected to a converter device, the cable being connectable to a remote radio head.
Figure 7B:
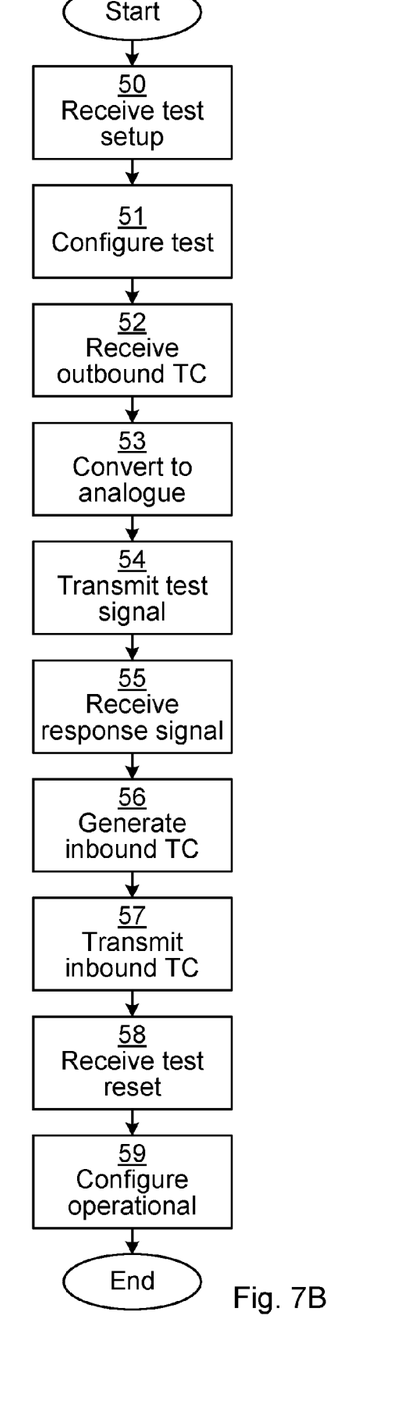

FIGS. 7A-B are flow charts illustrating embodiments of methods for testing a cable connected to a converter device, the cable being connectable to a remote radio head. The methods are performed in a converter device (5 of FIG. 1). The methods correspond to the activities of the converter device shown in FIG. 5 and described above.

In a receive outbound test container step 52, an outbound test container (105 of FIG. 5) and a frequency parameter is received from a test device. The outbound test container comprises digital samples representing a test signal and the frequency parameter indicates a frequency on which the test signal is to be transmitted. The frequency parameter can be received as part of or in conjunction with the outbound test container. Alternatively, the frequency parameter is received separately from the outbound test container. Optionally, the outbound test container comprises routing data, the routing data comprising any one or more of: multiple input multiple output, MIMO, branch, outbound port, and inbound port which is to be used by the converter device. In such a case, the converter device applies the routing data for the data of the test container.

In a convert to analogue step 53, the digital samples of the outbound test container are converted to an analogue test signal (107 of FIG. 5) on the frequency indicated by the frequency parameter.

In a transmit test signal step 54, the analogue test signal is transmitted on a cable connected to the converter device.

In a receive response signal step 55, an analogue response signal (108 of FIG. 5) is received from a cable connected to the converter device.

In a generate inbound TC step 56, an inbound test container (110 of FIG. 5) comprising digital samples of the analogue response signal is generated.

In a transmit inbound TC step 57, the inbound test container is transmitted to the test device.

Looking now to FIG. 7B, only new or modified steps compared to the method illustrated by the flow chart of FIG. 7A will be described.

In a receive test setup step 50, a test setup message (101 of FIG. 5) is received from the test device to configure the converter device to be in a test state.

In a configure test step 51, the converter device is configured to be in a test state, in accordance with the test setup message.

This configuration can comprise setting a first port of the converter device as one or more outbound ports to be used for transmitting the analogue test signal and/or setting one or more inbound port of the converter device as a port to be used for receiving the analogue response signal. The outbound ports and the inbound ports may, but do not need to, overlap.

In order to create a proper impedance mismatch at the cable end, the remote radio head can be either unpowered during the measurement procedure or disconnected. Mismatch is required since if the impedance is matched, there is no or negligible reflection. When the remote radio heads are powered over the cable, the converter device can switch off the remote radio head by disconnecting power over the cable.

It is also possible to control mismatch at the cable end using OAM commands sent by the converter device to the remote radio head indicating the start and stop of a measurement. The remote radio head then has a function to enter a impedance mismatch state, creating an artificial mismatch (open/close circuit) on request.

In one embodiment, the converter device sets the remote radio head in a loopback mode to for the cable testing. In such an embodiment, there does not need to be an impedance mismatch at the cable end; still, many characteristics of the cable can be tested with the procedures described herein.

In a receive test reset step 58, a test reset message (112 of FIG. 5) is received from the test device to configure the converter device to be in an operational state.

In a configure operational step 59, the converter device (5) is configured to be in an operational state, in response to receiving the test reset message.

Figure 8:
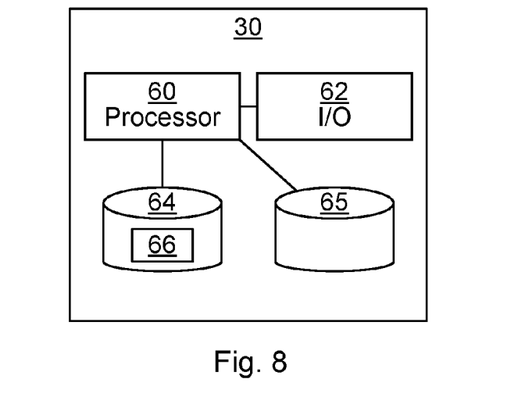
FIG. 8 is a schematic diagram showing some components of an embodiment of the test device of FIG. 1 and FIG. 5, here represented by a single test device.

FIG. 8 is a schematic diagram showing some components of an embodiment of the test device 30, 30*a*, 30*b* of FIG. 1 and FIG. 5, here represented by a single test device. It is to be noted that when the test device 30 forms part of a host device (e.g. in a baseband module of a radio base station), one or more of the components shown in FIG. 8 may be shared with the host device when appropriate.

A processor 60 is provided using any combination of one or more of a suitable central processing unit (CPU), multi-processor, microcontroller, digital signal processor (DSP), application specific integrated circuit (ASIC) etc., capable of executing software instructions 66 stored in a memory 64, which can thus be a computer program product. The processor 60 can be configured to execute the methods described with reference to FIGS. 6A-B above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 65 can be any combination of read and write memory (RAM) and read only memory (ROM). The data memory 65 may also comprise persistent storage, which, for example, can be any single one or combination of magnetic memory, optical memory, solid state memory or even remotely mounted memory. The data memory 65 can e.g. store test containers and data related thereto.

The test device 30 further comprises an I/O interface 62 for communicating with other entities. Optionally, the I/O interface 62 also comprises a user interface for operator control of the test device 30.

Other components of the test device 30 are omitted in order not to obscure the concepts presented herein.

Figure 9:
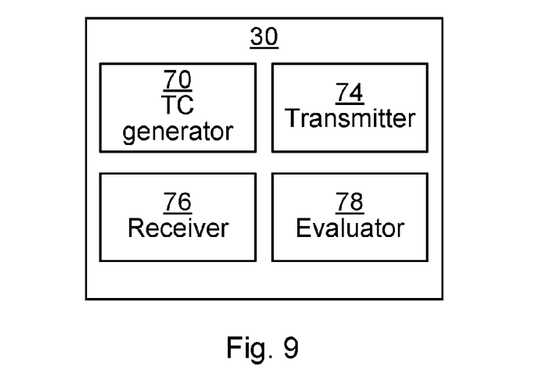
FIG. 9 is a schematic diagram showing functional modules of the test device of FIG. 8 according to one embodiment.

FIG. 9 is a schematic diagram showing functional modules of the test device 30 of FIG. 8 according to one embodiment. The modules are implemented using software instructions such as a computer program executing in the test device 30. The modules correspond to the steps in the methods illustrated in FIGS. 6A-B.

A TC generator 70 is configured to generate an outbound test container, where the outbound test container comprises digital samples representing a test signal. This module corresponds to the generate outbound TC step 42 of FIGS. 6A-B.

A transmitter 74 is configured to transmit the outbound test container and a frequency parameter indicating a frequency on which the test signal is to be transmitted to a converter device being connectable to a plurality of remote radio heads via respective cables, for transmission by the converter device. The transmitter may also be configured to transmit a test setup message to the converter device to configure the converter device to be in a test state and to transmit a test reset message to the converter device to configure the converter device to be in a fully operational state. This module corresponds to the transmit outbound TC step 44 of FIGS. 6A-B and the transmit test setup step 40 and the transmit test reset step 49 of FIG. 6B.

A receiver 76 is configured to receive an inbound test container, where the inbound test container comprises digital samples of a response signal received by the converter device based on the outbound test container. This module corresponds to the receive inbound TC step 46 of FIGS. 6A-B.

An evaluator 78 is configured to evaluate the inbound test container. This module corresponds to the evaluate step 48 of FIGS. 6A-B.

Figure 10:
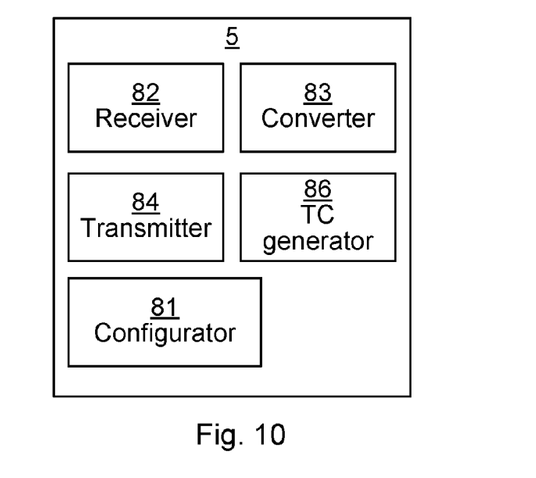
FIG. 10 is a schematic diagram showing functional modules of the converter device of FIG. 2 according to one embodiment.

FIG. 10 is a schematic diagram showing functional modules of the converter device 5 of FIG. 2 according to one embodiment. The modules are implemented using software instructions such as a computer program executing in the converter device 5. The modules correspond to the steps in the methods illustrated in FIGS. 7A-B.

A receiver 82 is configured to receive an outbound test container and a frequency parameter from a test device, where the outbound test container comprises digital samples representing a test signal wherein the frequency parameter indicates a frequency on which the test signal is to be transmitted. The receiver 82 is further configured to receive an analogue response signal from a cable connected to the converter device. Optionally, the receiver 82 is further configured to receive a test setup message from the test device to configure the converter device to be in a test state and to receive a test reset message from the test device to configure the converter device to be in an operational state. This module corresponds to the receive outbound TC step 52 and the receive response signal step 55 of FIGS. 7A-B, and to the receive test setup step 50 and the receive test reset step 58 of FIGS. 7A-B.

A converter 83 is configured to convert the digital samples of the outbound test container to an analogue test signal on the frequency indicated by the frequency parameter. This module corresponds to the convert to analogue step 53 of FIGS. 7A-B.

A transmitter 84 is configured to transmit the analogue test signal on a cable connected to the converter device and to transmit the inbound test container to the test device. This module corresponds to transmit test signal step 54 and the transmit inbound TC step 57 of FIGS. 7A-B.

A TC generator 86 is configured to generate the inbound test container comprising digital samples of the analogue response signal. This module corresponds to the generate inbound TC step 56 of FIG. 7A.

A configurator 81 is configured to configure the converter device to be in a test state and to configure the converter device to be in an operational state.

This module corresponds to the configure test step 51 and the configure operational step 59 of FIG. 7B.

Figure 11:
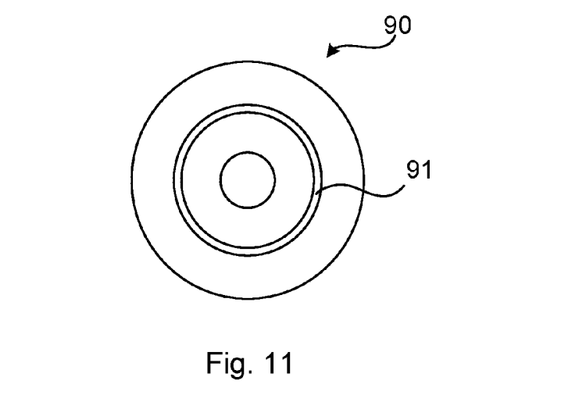
FIG. 11 shows one example of a computer program product comprising computer readable means.

FIG. 11 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 66 of FIG. 8. While the computer program 91 is here schematically shown as a track on the depicted optical disk, the computer program can be stored in any way which is suitable for the computer program product, such as a removable solid state memory, e.g. a Universal Serial Bus (USB) drive.

Using the embodiments presented herein, a centralised cable testing is provided using test containers. This significantly simplifies the deployment of remote radio heads, both in duration and personnel requirements.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for testing a cable connectable to a remote radio head of a plurality of remote radio heads connectable to a same radio base station of a wireless communication network, the method being performed in a test device and comprising the steps of:
generating, by the test device, an outbound test container, the outbound test container comprising digital samples representing a test signal;
transmitting, by the test device, the outbound test container and a frequency parameter, indicating a frequency on which the test signal is to be transmitted, to a converter device being connectable to the plurality of remote radio heads connectable to the same radio base station via respective cables, for transmission by the converter device;
receiving an inbound test container at the test device, the inbound test container comprising digital samples of a response signal received by the converter device based on the outbound test container; and
evaluating, by the test device, the inbound test container,
wherein the test device is a separate device from the converter device, and
wherein each of the plurality of remote radio heads is configured to transmit wireless signals to a user equipment as part of a single radio cell of the wireless communication network.

2. The method according to claim 1, wherein the step of generating an outbound test container comprises including the frequency parameter in the outbound test container; and wherein the step of transmitting comprises transmitting the frequency parameter as part of the outbound test container.

3. The method according to claim 1, further comprising the step of:
transmitting a test setup message to the converter device to configure the converter device to be in a test state.

4. The method according to claim 3, further comprising the step of:
transmitting a test reset message to the converter device to configure the converter device to be in a fully operational state.

5. The method according to claim 1, wherein the step of generating the outbound test container comprises generating the outbound test container comprising routing data, the routing data comprising any one or more of: multiple input multiple output, MIMO, branch, outbound port, and inbound port.

6. The method according to claim 1, wherein the step of evaluating the inbound test container comprises estimating any one or more of cable length, near and remote termination type, time domain transfer function, frequency domain transfer function, amplitude transfer function, phase transfer function, return loss, insertion loss, cable delay and skew of a cable connected to the converter device.

7. The method according to claim 1, wherein the step of evaluating comprises evaluating a noise level.

8. The method of claim 1, wherein the test device includes a baseband module.

9. The method of claim 1, wherein the converter device is an indoor radio unit.

10. The method of claim 1, wherein the step of transmitting, by the test device, the outbound test container and a frequency parameter indicating a frequency on which the test signal is to be transmitted to a converter device being connectable to a plurality of remote radio heads via respective cables, for transmission by the converter device is transmitted using a Common Public Radio Interface (CPRI).

11. A test device for testing a cable connectable to a remote radio head of a plurality of remote radio heads connectable to a same radio base station of a wireless communication network, the test device comprising:
a processor; and
a memory storing instructions that, when executed by the processor, causes the test device to:
generate an outbound test container, the outbound test container comprising digital samples representing a test signal;
transmit the outbound test container and a frequency parameter, indicating a frequency on which the test signal is to be transmitted, to a converter device being connectable to the plurality of remote radio heads connectable to the same radio base station via respective cables, for transmission by the converter device;
receive an inbound test container, the inbound test container comprising digital samples of a response signal received by the converter device based on the outbound test container; and
evaluate the inbound test container,
wherein the test device is a separate device from the converter device, and
wherein each of the plurality of remote radio heads is configured to transmit wireless signals to a user equipment as part of a single radio cell of the wireless communication network.

12. The test device according to claim 11, wherein the instructions to generate an outbound test container comprise instructions that, when executed by the processor, causes the test device to include the frequency parameter in the outbound test container; and wherein the instructions to transmit an outbound test container comprise instructions that, when executed by the processor, causes the test device to transmit the frequency parameter as part of the outbound test container.

13. The test device according to claim 11, further comprising instructions that, when executed by the processor, causes the test device to transmit a test setup message to the converter device to configure the converter device to be in a test state.

14. The test device according to claim 13, further comprising instructions that, when executed by the processor, causes the test device to transmit a test reset message to the converter device to configure the converter device to be in a fully operational state.

15. The test device according to claim 11, wherein the instructions to generate the outbound test container comprise instructions that, when executed by the processor, causes the test device to generate the outbound test container comprising routing data, the routing data comprising any one or more of: multiple input multiple output, MIMO, branches, outbound port, and inbound port.

16. The test device according to claim 11, wherein the instructions to evaluate the inbound test container comprise instructions that, when executed by the processor, causes the test device to estimate any one or more of cable length, near and remote termination type, time domain transfer function, frequency domain transfer function, amplitude transfer function, phase transfer function, return loss, insertion loss, cable delay and skew of a cable connected to the converter device.

17. The test device according to claim 11, wherein the instructions to evaluate comprise instructions that, when executed by the processor, causes the test device to evaluate a noise level.

18. A test device comprising:
means for generating an outbound test container, the outbound test container comprising digital samples representing a test signal;
means for transmitting the outbound test container and a frequency parameter, indicating a frequency on which the test signal is to be transmitted, to a converter device being connectable to a plurality of remote radio heads connectable to the same radio base station via respective cables, for transmission by the converter device;
means for receiving an inbound test container, the inbound test container comprising digital samples of a response signal received by the converter device based on the outbound test container; and
means for evaluating the inbound test container,
wherein the test device is a separate device from the converter device, and
wherein each of the plurality of remote radio heads is configured to transmit wireless signals to a user equipment as part of a single radio cell of the wireless communication network.

19. A non-transitory computer readable medium which contains a computer program for testing a cable connectable to a remote radio head of a plurality of remote radio heads connectable to a same radio base station, by a test device which, when run on the test device causes the test device to:
generate an outbound test container, the outbound test container comprising digital samples representing a test signal;
transmit the outbound test container and a frequency parameter, indicating a frequency on which the test signal is to be transmitted, to a converter device being connectable to the plurality of remote radio heads connectable to the same radio base station via respective cables, for transmission by the converter device;
receive an inbound test container, the inbound test container comprising digital samples of a response signal received by the converter device based on the outbound test container; and
evaluate the inbound test container,
wherein the test device is a separate device from the converter device, and
wherein the remote radio head is configured to transmit wireless signals to a user equipment as part of a single radio cell of the wireless communication network.

20. A method for enabling testing of a cable connected to a converter device, the cable being connectable to a remote radio head of a plurality of remote radio heads connectable to a same radio base station, the method being performed in the converter device and comprising the steps of:
receiving an outbound test container and a frequency parameter from a test device, the outbound test container comprising digital samples representing a test signal, wherein the frequency parameter indicates a frequency on which the test signal is to be transmitted;
converting the digital samples of the outbound test container to an analogue test signal on the frequency indicated by the frequency parameter;
transmitting the analogue test signal on a cable connected to the converter device;
receiving an analogue response signal from a cable connected to the converter device;
generating an inbound test container comprising digital samples of the analogue response signal; and
transmitting the inbound test container to the test device,
wherein the test device is a separate device from the converter device, and
wherein the remote radio head is configured to transmit wireless signals to a user equipment as part of a single radio cell of the wireless communication network.

21. The method according to claim 20, further comprising the steps of:
receiving a test setup message from the test device to configure the converter device to be in a test state; and
configuring the converter device to be in a test state.

22. The method according to claim 21, wherein the step of configuring the converter device to be in a test state comprises setting a first port of the converter device as a port to be used for transmitting the analogue test signal, and/or setting a second port of the converter device as a port to be used for receiving the analogue response signal.

23. The method according to claim 20, further comprising the steps of:
receiving a test reset message from the test device to configure the converter device to be in an operational state; and
configuring the converter device to be in an operational state.

* * * * *